June 23, 1953   F. GOULD   2,643,189
PRESERVED ERISTALIS GENUS, CRANE FLY LARVAE, AND METHOD
Filed March 5, 1952

INVENTOR.
Frederick Gould
BY Owen & Owen

ATTORNEYS

Patented June 23, 1953

2,643,189

UNITED STATES PATENT OFFICE 2,643,189

PRESERVED ERISTALIS GENUS, CRANE FLY LARVAE, AND METHOD

Frederick Gould, Angola, Ind.

Application March 5, 1952, Serial No. 274,876

9 Claims. (Cl. 99—3)

This invention relates to preserved Eristalis genus, crane fly larvae, and to a method for the preservation of such larvae.

Eristalis genus, crane fly larvae, are much sought after by fishermen for use as bait, by whom they are frequently called "mousee," or "rat tailed maggots." However, they are not generally available in fishing areas, being found principally around canneries. Efforts to make such larvae available to fishermen, alive, have been made; however, the larvae have long tails which become badly entangled when they are packed alive. Larvae so entangled are virtually useless, because separation is almost impossible; the frail bodies break before disentanglement can be achieved.

The present invention is based upon the discovery of a method for preserving Eristalis genus, crane fly larvae, called Eristalis larvae, herein, for convenience, and provides such larvae in a preserved state, to make them readily available in any fishing area.

It is therefore the principal object of the present invention to provide preserved Eristalis larvae, and a method for the preservation thereof.

Figure 1:
Figure 2:
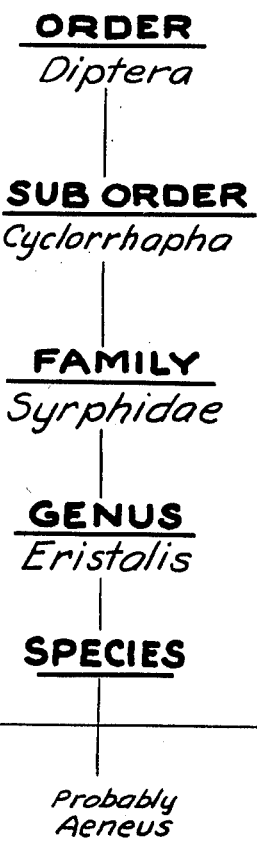

Other objects and advantages are apparent from the description which follows, and from the accompanying drawings, which are intended to explain and disclose, but not to limit the invention. In the drawings, Fig. 1 is a representation of a preferred species of Eristalis larvae suitable for preservation according to the invention; and Fig. 2 is a diagram showing the classification of Eristalis larvae in the insect world.

According to the invention, preserved Eristalis larvae are provided. Preservation is accomplished by clabbering, by immersion of the live larvae for from five to ten minutes in water at a temperature from 150° F. to 180° F., immersion in a preserving solution for from 10 to 30 days, and packing in a treated sawdust. So far as is known, Eristalis larvae so preserved have not heretofore been produced.

"Clabbering" of larvae, as described above, refers to a thickening of the entrails thereof from a milky to a cheese-like consistency. It is essential that clabbering be accomplished in water not hotter than about 180° F.; otherwise the larvae lose their natural curl and lifelike appearance. Similarly, immersion for longer than about ten minutes is disadvantageous for the same reason. Clabbering does not occur in water at a temperature from 150° F. to 180° F. in less than about five minutes, nor, in a reasonable time at temperatures below 150° F.

After clabbering, the larvae are immersed in a preserving or saturating solution for from 10 to 30 days, preferably from 10 to 15 days, until substantial saturation of the larvae by the solution is achieved. During this immersion the larvae are bleached to a substantially whiter color, and are essentially saturated with the preserving solution. The preserving solution is composed of from about 10 to about 20 parts of a deodorant, preferably about 14, from about 5 to about 10 parts of aqueous, 37 per cent formaldehyde, preferable about 7, and from 70 to 85 parts of water. The terms "per cent" and "parts" are used herein, and in the appended claims, to mean per cent and parts by weight, unless otherwise indicated. A suitable deodorant can be produced in accordance with the teachings of U. S. Patent 2,310,099. Such a deodorant can be prepared by making a water solution containing about 5 per cent of mercuric iodide, 9 per cent of potassium iodide, and 17.5 per cent of sodium hydroxide, and diluting the solution which results with from 6 to 7 parts of water per part of solution. Such a diluted deodorant is commercially available under the trade name "Nil," which product has been found to be entirely satisfactory for use as described, and in the proportions indicated. Other deodorants can be used, and in amounts effective to counteract the formaldehyde aroma, but the described deodorant is preferred because it is easy to use, and relatively effective and economical.

Accordingly, it will be apparent that a preferred preserving or saturating solution contains from 1.5 to 4 per cent of HCHO, from 0.05 to 1.5 per cent of mercuric iodide, from 0.1 to 0.25 per cent of potassium iodide, and from 0.2 to 0.5 per cent of sodium hydroxide.

It is essential that the clabbered Eristalis larvae be left in the preserving or saturating solution at least until substantially saturated therewith. Immersion for from 10 to 30 days assures such saturation. However, if the larvae are left in the solution for more than about 30 days they lose their natural curl, and become unmarketable. It is preferable, therefore, that immersion in the preserving solution be for from 10 to 15 days, as substantial saturation is assured, and the danger of loss of curl is avoided. Eristalis larvae so saturated, so far as is known, have not heretofore been produced.

Saturated larvae, produced as described above, however, are not suitable for shipment to vendors of fishing baits, as they will dry and shrivel if exposed to air, and will lose their natural curl if left in the preserving or saturating solution. It has been found that they can be packed in a treated sawdust and will retain their curl, color, and soft-clabbered condition for extended periods of time. The treated sawdust must be from a turpentine-bearing wood, preferably one containing a rosin. It must be moistened with a formaldehyde-deodorant-water solution so that the treated sawdust is composed of from 35 to 45 per cent, preferably about 40 per cent, of solution, and 55 to 65 per cent, preferably about 60 per cent, of sawdust, calculated on a dry basis.

The solution which results from moistening of the sawdust should have the same range of composition as the preserving or saturating solution described above. If the sawdust used has not been dried, allowance must be made for the moisture content thereof by use of a more concentrated solution for moistening. The treated sawdust, then, consists of from 35 to 45 per cent of a solution, and from 65 to 55 per cent of dry sawdust. The solution contains from 1.5 to 4 per cent of formaldehyde, preferably about 2.7 per cent, and from 10 to 20 per cent of a deodorant, preferably about 14 per cent. If dried sawdust is used, the moistening solution can have the composition indicated.

Eristalis larvae, after immersion in the preserving or saturating solution for the stated time, are placed in sawdust treated as described above. So packed they are found to retain their natural curl, their white color, and their soft clabbered condition for extended periods of time, and to be excellent fish baits. Sufficient treated sawdust should be employed that the larvae are essentially surrounded thereby, usually from one to ten volumes of sawdust per volume of larvae. In general, a small amount of treated sawdust will preserve the larvae for a relatively short period of time, while a larger amount will be effective for a longer time. Commercially satisfactory results are achieved when the volume ratio of uncompacted treated sawdust to larvae is within the indicated limits.

Referring now to the drawings, Fig. 1 shows one species of Eristalis larvae which has been found to be particularly satisfactory, in a preserved condition, as a fishing bait. The species of Eristalis larvae represented, so far as can be ascertained, is an unnamed species. It is commonly called a rat-tailed maggot, in common with other Eristalis larvae.

Fig. 2 shows the entomological classification of Eristalis larvae: they belong to the order Diptera, suborder Cyclorrhapha, family Syrphidae, and constitute the genus Eristalis. At least three Eristalis species are recognized, one of which is not named, but is pictured in Figs. A, B and C, page 327, "Larvae of Insects," part II, Alvah Peterson. Two other species are also pictured, Figs. D and E, species probably aeneus, and Figs. F and G, species probably arbustorum. See, also, "The Cambridge Natural History," volume 6, Insects, Part 2, McMillan, Copyright 1899 (reprinted in 1922), page 499.

The invention is not limited to the specific embodiments shown, as various modifications can be made without departing from the spirit of the claims.

Having described the invention, I claim:

1. A method of preserving Eristalis larvae that comprises clabbering by immersion of the live larvae in water at a temperature of from 150° F. to 180° F. for from five to ten minutes, placing the clabbered larvae in an aqueous preserving solution containing from 1.5 to 4 per cent of formaldehyde and sufficient deodorant to counteract the formaldehyde odor, and leaving the larvae in the preserving solution for from ten to thirty days, and positioning the so treated larvae in a closed container in intimate admixture with a treated sawdust comprising from 55 to 65 parts of sawdust of a turpentine-bearing wood moistened with from 45 to 35 parts of an aqueous solution containing from 1.5 to 4 per cent of formaldehyde and sufficient deodorant to counteract the formaldehyde odor.

2. A method of preserving Eristalis larvae that comprises clabbering by immersion of the live larvae in water at a temperature from 150° F. to 180° F. for from 5 to 10 minutes, placing the clabbered larvae in an aqueous preserving solution containing from 1.5 to 4 per cent of formaldehyde, from 0.05 to 0.15 per cent of mercuric iodide, from 0.1 to 0.25 per cent of potassium iodide, and from 0.2 to 0.5 per cent of sodium hydroxide, and leaving the larvae in the preserving solution for from 10 to 30 days, and positioning the so treated larvae in a closed container in intimate admixture with a treated sawdust comprising from 55 to 65 parts of sawdust of a turpentine-bearing wood moistened with from 45 to 35 parts of an aqueous solution containing from 1.5 to 4 per cent of formaldehyde, from 0.05 to 0.15 per cent of mercuric iodide, 0.1 to 0.25 per cent of potassium iodide, and 0.2 to 0.5 per cent of sodium hydroxide.

3. A method of preserving Eristalis larvae that comprises clabbering by immersion of the live larvae in water at a temperature of from 150° F. to 180° F. for about 5 minutes, placing the clabbered larvae in an aqueous preserving solution containing about 2.7 per cent of formaldehyde, about 0.084 per cent of mercuric iodide, 0.18 per cent of potassium iodide, and 0.31 per cent of sodium hydroxide, and leaving the larvae in the preserving solution for from 10 to 15 days, and positioning the so treated larvae in a closed container in intimate admixture with a treated sawdust comprising from 55 to 65 parts of sawdust of a turpentine-bearing wood containing rosin moistened with about 40 parts of an aqueous solution containing about 2.7 per cent of formaldehyde, about 0.084 per cent of mercuric iodide, about 0.18 per cent of potassium iodide, and about 0.31 per cent of sodium hydroxide.

4. A method of preserving Eristalis larvae of the species represented by Fig. 1 of the attached drawings that comprises clabbering by immersion of the live larvae in water at a temperature of from 150° F. to 180° F. for about 5 minutes, placing the clabbered larvae in an aqueous preserving solution containing about 2.7 per cent of formaldehyde, about 0.084 per cent of mercuric iodide, 0.18 per cent of potassium iodide, and 0.31 per cent of sodium hydroxide, and leaving the larvae in the preserving solution for from 10 to 15 days, and positioning the so treated larvae in a closed container in intimate admixture with a treated sawdust comprising from 55 to 65 parts of sawdust of a turpentine-bearing wood containing rosin moistened with about 45 parts of an aqueous solution containing about 2.7 per cent of formaldehyde, about 0.084 per cent of mercuric iodide, about 0.18 per cent of potassium iodide, and about 0.31 per cent of sodium hydroxide.

5. Clabbered Eristalis larvae substantially saturated with an aqueous solution containing from 1.5 to 4 per cent of formaldehyde and sufficient deodorant to counteract the formaldehyde odor, and in intimate admixture with a treated sawdust comprising from 55 to 65 parts of sawdust of a turpentine-bearing wood moistened with from 45 to 35 parts of an aqueous solution containing from 1.5 to 4 per cent of formaldehyde and sufficient deodorant to counteract the formaldehyde odor.

6. Clabbered Eristalis larvae substantially saturated with an aqueous solution containing about 2.7 per cent of formaldehyde, about 0.084 per cent of mercuric iodide, 0.18 per cent of potassium iodide, and 0.31 per cent of sodium hydroxide, and in intimate admixture with a treated sawdust comprising from 55 to 65 parts of sawdust of a turpentine-bearing wood moistened with from 45 to 35 parts of an aqueous solution containing from 1.5 to 4 per cent of formaldehyde, about 0.084 per cent of mercuric iodide, about 0.18 per cent of potassium iodide, and about 0.31 per cent of sodium hydroxide.

7. Clabbered Eristalis larvae substantially saturated with an aqueous solution containing about 2.7 per cent of formaldehyde, about 0.084 per cent of mercuric iodide, 0.18 per cent of potassium iodide, and about 0.31 per cent of sodium hydroxide, and in intimate admixture with a treated sawdust comprising about 60 parts of sawdust of a turpentine-bearing wood containing rosin moistened with approximately 40 parts of an aqueous solution containing approximately 2.7 per cent of formaldehyde, about 0.084 per cent of mercuric iodide, about 0.18 per cent of potassium iodide, and about 0.31 per cent of sodium hydroxide.

8. Clabbered Eristalis larvae substantially saturated with an aqueous solution containing from 1.5 to 4 per cent of formaldehyde, and in intimate admixture with a treated sawdust comprising about 60 parts of sawdust of a turpentine-bearing wood containing rosin moistened with about 40 parts of an aqueous solution containing from 1.5 to 4 per cent of formaldehyde.

9. Clabbered Eristalis larvae of the species represented by Fig. 1 of the attached drawings substantially saturated with an aqueous solution containing about 2.7 per cent of formaldehyde, about 0.084 per cent of mercuric iodide, 0.18 per cent of potassium iodide, and about 0.31 per cent of sodium hydroxide, and in intimate admixture with a treated sawdust comprising about 60 parts of sawdust of a turpentine-bearing wood containing rosin moistened with approximately 40 parts of an aqueous solution containing approximately 2.7 per cent of formaldehyde, about 0.084 per cent of mercuric iodide, about 0.18 per cent of potassium iodide, and about 0.31 per cent of sodium hydroxide.

FREDERICK GOULD.

No references cited.